United States Patent [19]
Brinkmeyer et al.

[11] Patent Number: 5,838,251
[45] Date of Patent: Nov. 17, 1998

[54] METHOD AND DEVICE FOR PROGRAMMING OPERATING DATA INTO VEHICLE COMPONENTS

[75] Inventors: Horst Brinkmeyer, Waiblingen; Guenter Schwegler, Weinstadt; Brigitte Althen; Bertolt Krueger, both of Bonn; Konrad Klein, Ostfildern; Thomas Krehbiehl, Winterbach; Guenther Metsch, Moeglingen, all of Germany

[73] Assignee: Mercedes-Benz AG, Stuttgart, Germany

[21] Appl. No.: 706,938

[22] Filed: Sep. 3, 1996

[30] Foreign Application Priority Data

Aug. 31, 1995 [DE] Germany ......................... 195 32 067.0

[51] Int. Cl.⁶ ...................................................... H04Q 1/00
[52] U.S. Cl. .................. 340/825.31; 340/426; 307/10.2; 364/245.2
[58] Field of Search ................................ 340/425.5, 426, 340/825.31; 307/10.2; 180/287; 364/245.2

[56] References Cited

U.S. PATENT DOCUMENTS

| | | | |
|---|---|---|---|
| 4,727,368 | 2/1988 | Larson | 340/825.31 |
| 4,766,746 | 8/1988 | Henderson | 340/825.31 |
| 5,117,217 | 5/1992 | Nukerk | 340/426 |
| 5,138,548 | 8/1992 | Keinle | 364/245.2 |
| 5,229,648 | 7/1993 | Sues | 340/825.31 |
| 5,521,588 | 5/1996 | Kuhner | 340/825.31 |

FOREIGN PATENT DOCUMENTS

| | | |
|---|---|---|
| 0 723 896 | 7/1996 | European Pat. Off. . |
| 43 34 859 | 12/1994 | Germany ......................... 340/825.31 |
| 43 33 474 | 2/1995 | Germany . |
| 43 38 033 | 5/1995 | Germany . |
| 43 42 641 | 6/1995 | Germany . |
| 44 15 052 | 11/1995 | Germany . |
| 2 274 347 | 7/1994 | United Kingdom . |
| 2 285 702 | 7/1995 | United Kingdom . |

*Primary Examiner*—Brian Zimmerman
*Attorney, Agent, or Firm*—Evenson, McKeown, Edwards & Lenahan, P.L.L.C.

[57] ABSTRACT

A method and a device with which data can be programmed into a vehicle component are provided. It is proposed to keep available at a central office the data which it encodes upon request with a code that is specific to the vehicle component and transmits it to the requesting location, and decoding is performed only in the vehicle component itself. In this way, a high level of protection against unauthorized attempts to acquire data during transmission of this data to be programmed into the component is ensured. Suitable devices for working the method include direct connectability of the individual vehicle component to a programming device at the requesting location for direct programming, or alternatively, intermediate connection of an intermediate storage component. In this way, for example, mobility-limiting key programming can be achieved that is highly protected against manipulation. The method and device are usable in vehicles with an anti-theft protection system and for vehicle rental systems.

20 Claims, 6 Drawing Sheets

METHOD AND DEVICE FOR PROGRAMMING OPERATING DATA INTO VEHICLE COMPONENTS

BACKGROUND AND SUMMARY OF THE INVENTION

The invention relates to a method and a device for programming data into vehicle components, said data being required by the respective vehicle components when the latter are intended to operate in the vehicle in question in a desired normal fashion. The method and device are especially suitable for supplying vehicle spare parts with the required vehicle-related data at the point in time when their use in a certain vehicle is intended. Secret data that form part of a vehicle anti-theft protection system are of particular interest. The term "vehicle component" is to be understood here in a broad sense to include, in addition to components that are permanently installed in the vehicle, other vehicle-related components, especially vehicle keys.

In order to provide convenient service that is as universally available as possible for motor vehicles, it is especially important to be able to supply vehicle components, especially spare parts, as rapidly and comprehensively as possible. Besides supplying individual service centers with the vehicle component hardware they require, there is an additional task involving components that comprise electronic vehicle elements that must contain vehicle-specific data for proper operation. In order to ensure rapid deliverability, provision is made for programming the required data into such vehicle components on site. The vehicle-related data are then requested by an individual service center from a central office, and said data are then transmitted over a data transmission line, for example a telephone connecting network, a general or individual data network, or a data carrier conveyance to the service center so that they can be fed into the vehicle component in question, using suitable electronics.

This procedure can be implemented without difficulty provided the data to be transmitted are not secret. However, if secret data are involved, like those required for the components of a vehicle anti-theft protection system in particular, it must not be possible for unauthorized persons to acquire these data. Normally, therefore, the technique of encoding, i.e. enciphering these data employs a symmetric or asymmetric coding method like those conventionally used in cryptography. For this purpose, the data to be transmitted are encoded and then transmitted at the central office. The transmitted encoded data are received at the individual service center and decoded in a terminal, a PC for example, and then fed by a programming device connected in the circuit into the vehicle component in question. This method guarantees that the data will be protected against unauthorized attempts to acquire the data during their transmission over the data transmission line between the central office and the service center. There is a problem however in that these data become accessible, i.e. in the decoded state, at the service center itself between the decoding terminal and the vehicle part to be programmed. Monitoring to detect such secret data information in this data transfer section may therefore enable an unauthorized individual to bypass the anti-theft protection system of the vehicle. For example, interception of appropriate data that relate to the anti-theft protection system of the vehicle while said data are being programmed into a spare key can then be used to make additional duplicate keys without authorization, using these intercepted data.

German patent document DE 43 34 859 A1 describes a device that is suitable, among other things, for programming data into electronic control devices of motor vehicles, especially for vehicle-specific programming of control devices at the vehicle manufacturer. For this purpose, this device includes a mobile programming device external to the vehicle by which the data to be programmed can be transmitted without wires to a control device in the vehicle that is communications-capable, said control device feeding the data into the corresponding control device.

German patent document DE 41 23 666 A1 describes a security system for mobile vehicle components that comprises a central database at the manufacturer, a corresponding system control center at franchised dealers, and on the vehicle itself, a central unit and one or more component control units associated with the vehicle components involved. A factory code stored in the central database is fed by the manufacturer into the vehicle components in question and cannot be changed during their lifetimes or read by the system control centers. An individual system control center can feed data into the central unit on the vehicle and compare information obtained from the latter with information that it can call up from the central database. The central database can correlate the information it obtains from the individual system control center, such as authorizing code changes in the central unit on the vehicle or the respective component control unit, and thus maintain an inventory. When such a protected vehicle component is replaced, its individual code is fed from the database into the central unit aboard the vehicle.

The technical problem that constitutes the basis of the invention is the provision of a method and a device of the above-mentioned type by which the programming of data into a vehicle component is reliably protected against unauthorized attempts to acquire these operating data.

This goal is achieved by a method for programming data into a vehicle component, especially a vehicle spare part, in which data are requested from a central office, which transmits the data to the requesting location, wherein data are transmitted in encoded form from the central office at least with an individual vehicle-component-related code, and wherein the data that are encoded and are received by the requesting location with the code that is related to the vehicle component are decoded only in the vehicle component itself.

The goal is further achieved by a device for programming data into a vehicle component, especially a vehicle spare part. The device includes a central office with memories for vehicle-related data and for vehicle-component-related code data, as well as a coding device for encoding the data to be programmed into an individual vehicle component. One or more service centers are connected by a data transmission line with the central office, each center having a programming device to which the vehicle component to be programmed is connectable for supplying it with the received data whereby the vehicle component to be programmed with the data includes a decoder for decoding the data that are fed in and are encoded with the code that is related to the vehicle component.

In another embodiment, this goal is achieved by a device including a central office with memories for vehicle-related data, for coded data related to the intermediate storage component, and for code data related to the vehicle component, as well as with an encoder for successive encoding of the data to be programmed into an individual vehicle component first with the individual code related to the vehicle component and then with the code related to the intermediate storage component. One or more service centers are connected by a data transmission line with the central office and have a programming device to which an intermediate storage component is connectable to supply it with the received data, whereby the intermediate storage component has a decoder for decoding the doubly encoded data supplied with regard to the code related to the intermediate storage component, and then stores on an intermediate basis those data that are still encoded with the code related to the vehicle component, and after connection to a data transmission system on the vehicle, to which the vehicle component to be programmed with the data is connected, is fed into the latter, and whereby the vehicle component to be programmed with the data has a decoder for decoding the data encoded with the code related to the vehicle component that is fed in.

The risk of an unauthorized person acquiring the data information to be transmitted from the central office and stored in the individual vehicle components to be programmed is minimized by virtue of the fact that the data to be transmitted are decoded only in the vehicle component to be programmed with these data. The method and the device can be used in particular to render spare parts operable in a specific vehicle by programming the corresponding vehicle-related data into them. They can also be used to perform special functions in vehicle components, to block or clear electronic keys for a certain vehicle for example. As an additional application, preparation of a vehicle component for subsequent operation in a given vehicle by programming corresponding data into it can also consist in authorizing subsequent operation of the component, and hence of the vehicle, only within a limited scope, for example for a limited number of engine starts, a limited travel distance, a limited period of time, or only within a limited geographic area. Another possible application is in the field of vehicle rental, in which various vehicles at one or more different locations are made available to system users for short- or long-term use. In the two latter applications, it can be advantageous to transfer data sets for a given group of vehicles from a superior central office located at the vehicle manufacturer for example into a subordinate local central office located for example at an automobile rental office or leasing company.

In an improvement on the method according to the invention, before data can be requested from the central office, the identity of the vehicle and of the vehicle component to be programmed, as well as that of the system user making the inquiry, must be transmitted, so that the central office can check authorization to make the request and can encode and transmit the correct data for the vehicle component to be programmed. In addition, the central office is automatically informed about the components just used for an individual vehicle. The device according to Claim 10 is particularly suitable for working this method.

In an improvement on the method according to the invention, the encoded data are fed directly from the programming device of the individual service center into a vehicle component connected to the programming device for this purpose. An especially suitable device is provided for working this method.

An improvement on the method according to the invention indirectly transfers the encoded data received at the service center from the programming device into the vehicle component to be programmed through an intermediate storage component. The data are doubly encoded at the central office for this purpose and, after being received by the location requesting them, are initially fed from the programming device at that location into the connected intermediate storage component and decoded therein and stored on an intermediate basis. Then the intermediate storage component, preferably after being disconnected from the programming device, is coupled through a corresponding connecting interface to a data transmission system on the vehicle, for example, a CAN system or a diagnostic control system, after which the data stored on an intermediate basis are fed through the data transmission system aboard the vehicle into the vehicle component to be programmed and completely decoded therein. This procedure has the advantage that individual special adapters for the various vehicle components to be programmed are not required for connection to the programming device. The intermediate storage component itself can likewise be a vehicle component, an electronic key for example, that is designed as a special key for additionally performing the intermediate storage function. An especially suitable device is provided for working this method.

A preferred method is especially suitable for vehicle rental systems in which provision must be made for making certain vehicles available to certain customers, with the use of said vehicles being limited in time or space for example. By permanently assigning a key to an individual customer, the key can be used as proof of identity at the central rental office. The central office can then transmit data to the key in a customer-specific manner, said data containing, in addition to authorization to use the desired vehicle, a limitation of individual mobility, so that the customer can use the vehicle that the key fits, only for a predetermined period of time, a predetermined distance, or a predetermined number of engine starts for example. Both the transmission of the identification number to the central office and the transmission of the mobility limitation information can be sent back to the requesting key or intermediate storage component with code protection.

A preferred method limits the mobility of a vehicle by programming the matching vehicle key with a data set from the central office that permits only a predeterminable number of usage authorization approval actions by the key. With this measure, advantageous short-term vehicle rental can be performed with a low risk of fraud. A device according to the invention is especially suitable for working this method, in which the corresponding mobility-limiting driving authorization data are programmed into the key by a central office, a rental office for example, that has a key management module for managing the electronic keys of all participating vehicles, using a key programming unit built into the vehicle or provided in a permanent location, in a corresponding terminal at a parking space for example.

Another advantageous design according to the invention provides that the number of usage authorization issuing actions is recorded aboard the vehicle and a request is transmitted to the central office in a sufficient amount of time before reaching the preset number of permitted authorization actions to transmit an additional data set for programming into the vehicle key in order to permit usage authorization for the vehicle continuously through the key for an additional set of authorization actions. The new data set is transmitted from the central office only if the office has not received a relevant blocking message. A preferred device is suitable for working this method. In this way, the risk of a vehicle being stolen can be kept low, since a stolen vehicle or a door-locking system controlled with the key can be used for only a limited number of vehicle starts or control processes.

DETAILED DESCRIPTION OF THE DRAWINGS

Figure 1:
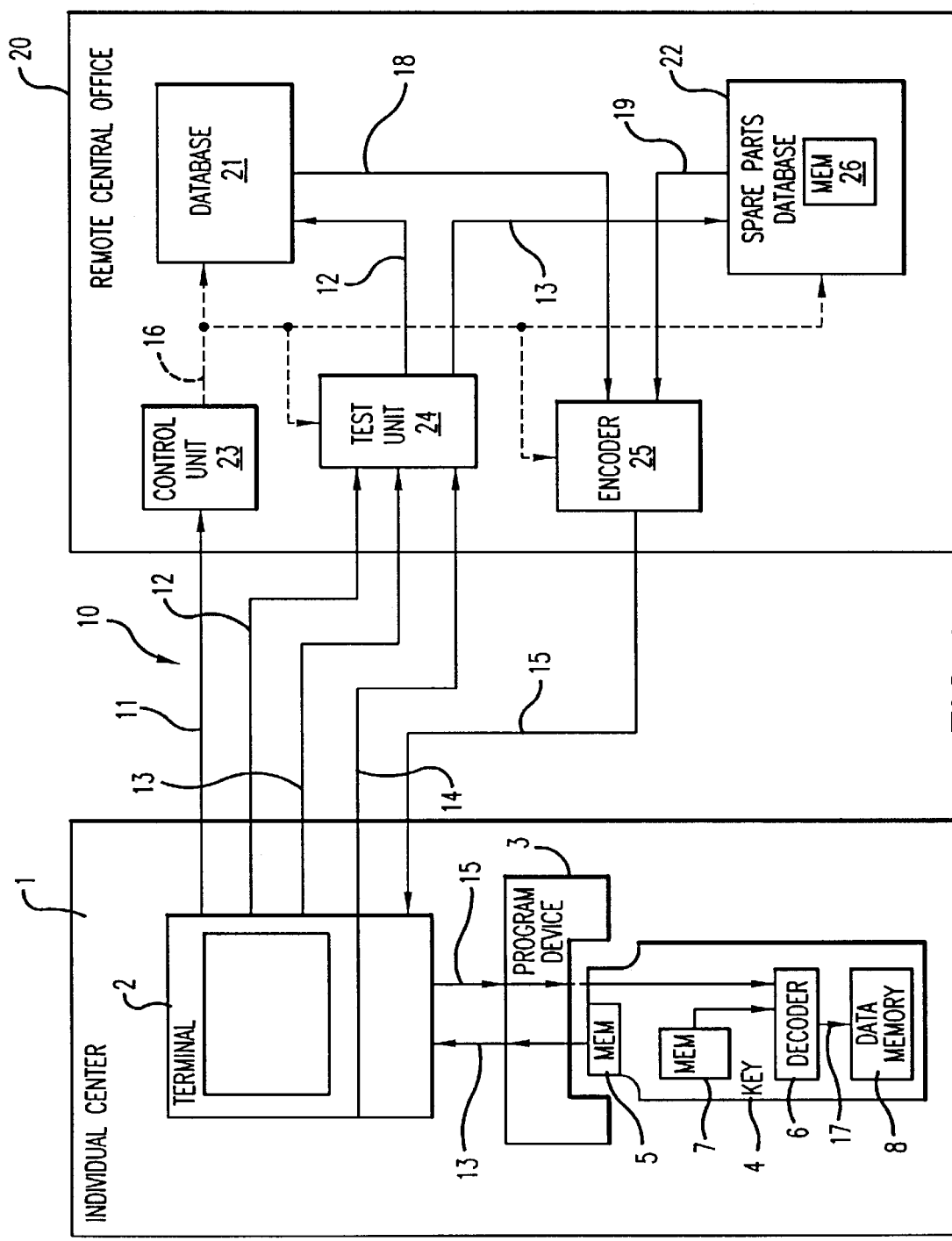
FIG. 1 is a schematic block diagram of a device according to the invention for programming vehicle-related data into an individual vehicle component, with direct data programming.

With reference to FIG. 1, a first method and the device for performing the method, used to program vehicle-related data into a vehicle component in the form of a spare key for example, are described. The device that performs the method is shown in FIG. 1 in the form of a block diagram. An individual center (1), a garage for example, has a data transmission link (10), a telephone line for example, that connects it with a remote central office (20), located at the vehicle manufacturer for example, to exchange data. At service center (1), a spare key (4), an example of a vehicle component, is to be supplied with secret cryptographic data so that it can be used for a very specific vehicle belonging to a customer, said vehicle having an anti-theft protection system in which usage authorization data are encoded by means of a corresponding cryptographic method, i.e. they are exchanged in enciphered form between the key and the vehicle. Such cryptographically protected methods of data exchange between the key and the vehicle, used to check vehicle usage authorization, are described for example in German patent documents DE 44 11 449 C1, DE 44 11 450 C1, and DE 44 11 451 C1, to which reference is made here for matter not essential to the invention.

For programming these vehicle-related data, involving in particular data that are relevant for the anti-theft protection system of the vehicle in question, a suitable data request is initially transmitted from service center (1) over telephone line (10) to central office (20). For this purpose, the following four items of data information are entered into a terminal (2) located at service center (1), said terminal having a screen and a keyboard, and are transmitted over telephone line (10) to central office (20) as symbolized in each case by a separate line (11 to 14). A first item of data information (11) relates to the nature of the operation to be performed, in this case information about the programming of a spare key. This information is fed at central office (20) to a control unit (23) that controls the other components of central office (20) that are involved in the method, in a manner that is suitable for performing the operation to be conducted, as symbolized by dashed line (16). As the second item of data information (12), an identification number must be provided for the vehicle in question, for example a vehicle identification number. Similarly, as the third item of data information (13), an identification number must be provided for spare key (4), for example a serial number of said key. This is stored temporarily in an electronic memory (5) from which it can be read out through a programming device (3), to which spare key (4) is connected at the service center (1) throughout the entire process, into terminal (2) to be passed on to central office (20). Alternatively, the characterizing number can be placed on a label on spare key (4), from which it can then be read and keyboarded into terminal (2). Finally, the operator who works the terminal must transmit information on authorization and proof of identity as the fourth item of data information (14) to central office (20).

The three latter items of data information (12, 13, 14) for a request for vehicle-related data for spare key (4) are fed to a testing unit (24) of central office (20) that checks at least whether the request is coming from an authorized location, whether the vehicle in question has been reported stolen, whether spare key (4) to be programmed with the vehicle-related data has itself not been reported stolen, and whether spare key (4) to be programmed was properly delivered to the service center (1) in question. If this test is passed regarding all four points, information (12) about the vehicle identification number is passed to a database (21) containing vehicle-related data at central office (20). A set of data is stored in database (21) that contains all the data relating to the anti-theft protection system of the vehicle for each vehicle produced by the manufacturer. The desired secret data (18) for spare key (4) can be read out from this database (21). The information (13) about the spare key identification number can then be passed to a spare parts database (22). In this spare parts database (22), an individual secret code value is stored in a memory (26) for each vehicle component into which vehicle-related data can be programmed. Accordingly, during the production of the individual spare part, a spare key (4) in this case for example, when using a symmetrical encoding method the same secret coded value is stored in spare part (4), while when an asymmetric encoding method is used an assigned secret coded value is stored in spare part (4).

The data issued by database (21) that contains vehicle-related data (18), like the coded value (19) issued by spare parts database (22), are special, secret, and valid only for the spare key (4) in question, and are fed to an encoder (25). This encoder (25) encodes the vehicle-related data to be transmitted, using the secret spare-part encoded value according to a conventional symmetric or asymmetric encoding method, and transmits encoded vehicle-related data (15) over telephone link (10) to service center (1). The encoded vehicle-related data (15) pass from terminal (2) through a suitable interface into programming device (3) into which spare key (4) has been inserted for deprogramming. In programming device (3), however, only data protocol adjustments are performed and the data are possibly changed to another medium for further transmission, from electrical signals into infrared signals for example.

In this manner, spare key (4) can advantageously be programmed using the same transmission/reception channels over which it communicates in later active operation with the devices on the vehicle, for example an ignition lock that functions electronically. This spare key-ignition lock data communication in particular includes the data exchange required for anti-theft protection to check the authorization of the spare key for the vehicle in question. Consequently, an independent interface for programming vehicle-related data into spare key (4) is not absolutely necessary. In addition, programming device (3) in this case can be made very simple in that it need only have the same interface as the unit that communicates in active operation with spare key (4), i.e. the ignition key for example. As already mentioned, no decoding of the encoded vehicle-related data takes place in programming device (3). Instead, these data are decoded only in spare key (4) itself, preferably within a microprocessor in the latter, by means of a decoder (6) with the assistance of the secret code value stored in a corresponding memory (7) in spare key (4), and stored as decoded data (17) in a data storage memory (8). Then vehicle-related data are available in spare key (4) in a usable uncoded form that makes spare key (4) fully functional for the vehicle in question, and also especially as regards its function within the anti-theft protection system of the vehicle.

One special advantage of the method described for programming the vehicle-related data into spare key (4) consists in the fact that the data never leave central office (20), i.e. in a decoded form. Instead, the vehicle-related data, on the entire transmission path between central office (20) and spare key (4), are encoded with a secret individual spare part coding value. This provides very reliable protection against unauthorized attempts to acquire these vehicle-related data for unauthorized programming of other spare keys. The unauthorized making of such duplicate keys or of duplicates of other vehicle components is further impeded by the fact that the set of vehicle-related data transmitted from central office (20), because the individual spare part coded value is used, can be used only for successfully programming the single vehicle component (4) mentioned in the request to central office (20).

The above method is highly suitable for those vehicle components to be programmed which, like spare key (4), can be inserted or connected directly with programming device (3) and communicate with it via its available interfaces. Since these interfaces are designed for the various programmable vehicle components to meet their individual needs, a special adapter for the programming device is required for each component or spare part in this procedure.

Figure 2:
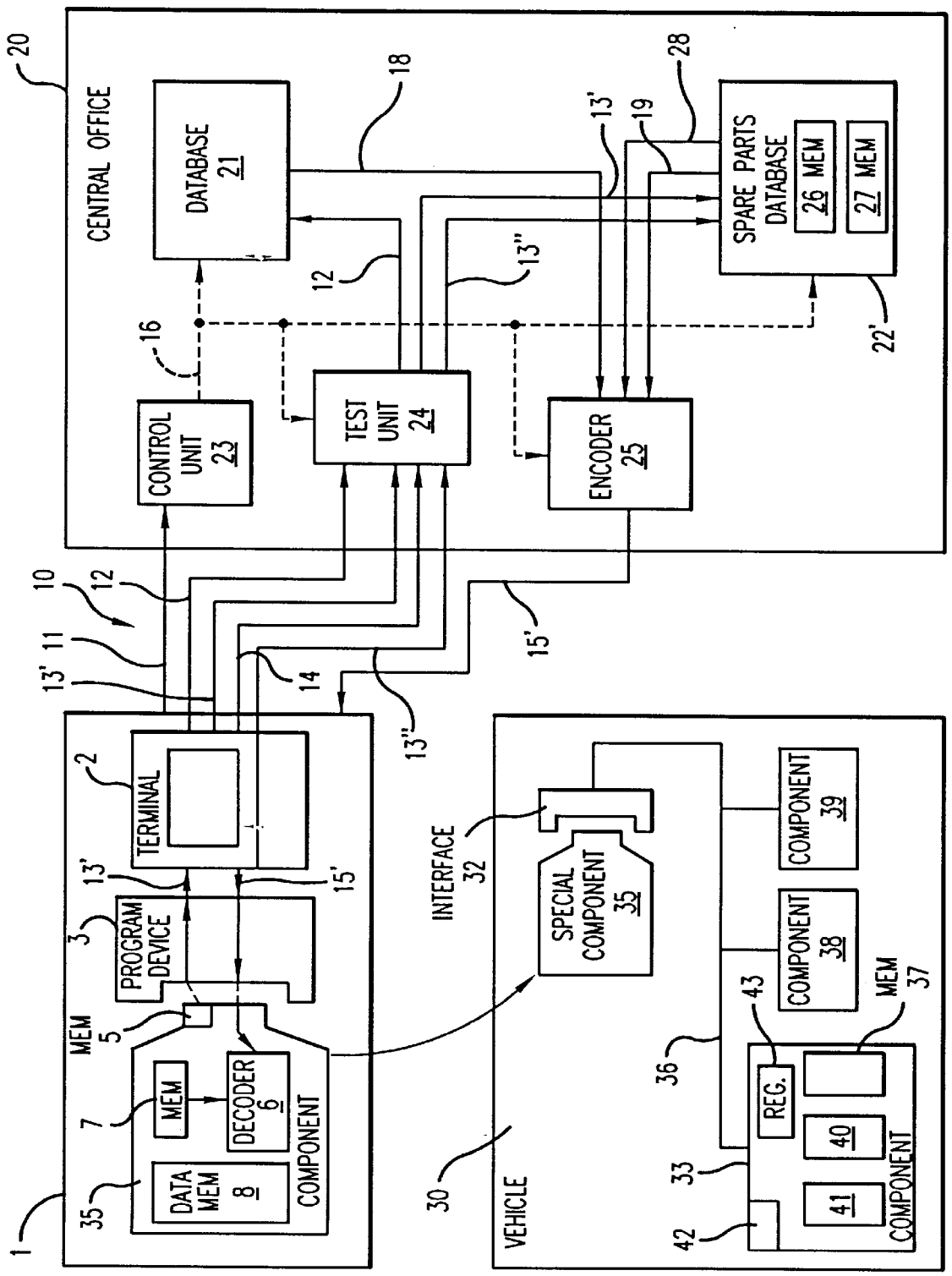
FIG. 2 is a schematic block diagram of a device according to the invention for programming vehicle-related data into an individual vehicle component, using an indirect programming process that employs an intermediate storage component.

In a procedure like that which is possible with the device shown in FIG. 2, no such plurality of special adapters need be provided. In this device, which will be described below, in which the same reference numerals have been used for elements that are functionally the same as in the device in FIG. 1, only one selected component (35) of programming device (3) serves for direct programming, so that programming device (3) need only be equipped with a single suitable interface for this component (35). In this method of indirect vehicle component programming, only this single component (35) receives the encoded vehicle-related data transmitted from central office (20) and then passes it on to an independent separate process in a vehicle component (33) actually to be programmed. The component (35) intended to be connected to programming device (3) is chosen so that it can simply be connected for data transmission with all the vehicle components that might possibly be programmed.

Component (35) can then be a special component, not on the vehicle itself, so designed that it can be connected easily in any vehicle to an existing data bus system or to a diagnostic line in order to output the data information that it has received from programming device (3) to the actual vehicle component (33) to be programmed, said component being connected to this bus system and/or to this diagnostic line. Alternatively, a component that is intended for the vehicle in any case is chosen as this component (35) that functions as an intermediate storage component for intermediate storage of the encoded vehicle-related data. In the example shown in FIG. 2, an electronic spare key (35) that fits the vehicle serves as this intermediate storage component. For the programming process, the case in which spare key (35) functions as the intermediate storage component that is itself to be programmed must be distinguished from the situation in which another vehicle component is to be programmed. In the first case, the procedure is exactly as described above for the device in FIG. 1. Spare key (35) is then connected, as the spare part to be programmed, directly to programming device (3) inside service center (1). In the other case of programming of another vehicle component (33), which is intended to contain secret cryptographic data for further operation with the vehicle, the selected spare key (35) merely functions as an intermediate storage component, in other words as a data storage medium, with the vehicle-related data being fed to it from programming device (3), and it outputs these data in the subsequent process to the actual vehicle component (33) to be programmed, located in the vehicle (30) in question. Because of this additional function, the selected spare key (35) will be referred to hereinbelow as a special key.

With reference to FIG. 2, the procedure for this indirect programming of a spare part (33) of the anti-theft protection system in the vehicle (30) in question using special key (35) will now be described. Special key (35) is preferably identical in design to spare key (4) according to FIG. 1. Once again, information about the nature of operation (11) to be performed is transmitted to central office (20) over telephone link (10) as information for a request for vehicle-related data, in this case spare-part programming for example, information (12) about the vehicle identification number, information (13") about the identification number, for example the serial number of the spare part (33) to be programmed, said number preferably being determined by reading from a label (42) applied to spare part (33) and entered into the system through terminal (2) at service center (1), information (14) as proof of authorization and identity of the user, in the form of a password or a user identity number for example, as well as information (13') about the identification number, such as the serial number of special key (35) for example. The last item of information mentioned (13') is currently read out from the individual special key memory (5). Alternatively, an applied label could be read and the information entered into terminal (2).

The first item of information mentioned (11) is fed in turn to control device (23) of central office (20) that controls the other components involved at central office (20), as symbolized by dashed lines (16). The last four items of information mentioned (12, 13', 13", 14) are fed to testing unit (24) to check the authorization of the data request. If the check is successful, testing unit (24) feeds vehicle identification number (12) to data base (21) with the vehicle-related data and identification number (13") of the spare part (33) to be programmed, as well as the number (13') of special key (35), to spare parts database (22') modified with respect to the device in FIG. 1, said database containing, in addition to memory (26) for coded values for each vehicle component, an additional storage location (27) for an individual coded value for the intermediate storage component, i.e. in this case a special key code value. Depending on whether a symmetric or asymmetric encoding method is used, the same or assigned coded values are stored in a coded value memory (37) of spare part (33) to be programmed or in coded value memory (7) of special key (35) by being stored during the production of spare part (33) or special key (35).

Database (21) for the vehicle-related secret data supplies said data (18) for spare part (33) to be programmed and feeds them to encoder (25). The encoder also receives the relative individual code value (19) for each spare part and the individual code value (28) for the special key from spare part database (22'). Encoder (25) initially encodes vehicle-specific data (18) with the aid of the individual coded value (19) for the spare part, said value being secret and valid only for spare part (33) to be programmed. Then these data, encoded once, are encoded again by encoder (25), this time with the aid of the individual coded value for the special key, said value being secret and valid only for the selected special key (35), and then transmitted as doubly-encoded data (15') over telephone link (10) to service center (1). There, data (15') initially pass through programming device (3) into special key (35) which has been inserted into programming device (3). On the basis of the transmitted data content, special key (35) recognizes that it is not supposed to be programmed as a spare key, but only as an intermediate storage component, or data transport medium for spare part (33) that is built into vehicle (30).

Doubly encoded vehicle-related data (15') are then decoded in decoder (6) inside special key (5) with the aid of the secret special key code value, and then stored on an intermediate basis in memory (8) as vehicle-related data that are still singly encoded with a secret code value that is individual to the spare part. Since these data are still encoded, they continue to be protected from unauthorized attempts to acquire them. Special key (35) is brought to vehicle (30) and inserted in a key interface device (32) on the vehicle. This key interface device (32) can be for example an electronic ignition starter switch of vehicle (30) through which the data communication that is relative to anti-theft protection flows between the key and the vehicle during normal operation.

Effective anti-theft protection is achieved in particular by virtue of the fact that as many operationally relevant vehicle components as possible are involved in anti-theft protection, that the encoded authentication data delivered by the key are decoded and verified in each of the components, and that in the event of successful authentication each component grants its own authorization to operate. All of these components, containing secret cryptographic data for anti-theft protection, are therefore connected in a communications network, preferably a data bus system. FIG. 2 for example shows a data bus system (36) to which, in addition to key interface device (32) and spare part (33) to be programmed for example, additional vehicle components (38, 39) are connected that can be programmed with data relative to anti-theft protection. From special key (35), which is now plugged into interface device (32), the data, still singly encoded, pass through vehicle data bus system (36) into the individual target components, in this case spare part (33) mentioned above. It is only in this individual spare part (33) that the data, still singly coded, preferably within a spare part microprocessor, are decoded in a decoder (40) with the aid of the secret code value stored in coded value memory (37) of spare part (33), so that spare part (33) becomes functionally capable within the anti-theft protection system of vehicle (30). The unencoded vehicle-related data are stored by decoder (40) in a data memory (41) in spare part (33).

Even in this example according to the invention of indirect programming of a spare part (33) with required data relative to the vehicle, there is a significant advantage in the fact that these data do not appear in uncoded form at any point along the transmission path between central office (20) and spare part (33). Since a similar component is connected to programming device (3), in a special case a special key (35), a single interface suffices for programming device (3) without different interface adapters being required. As an additional advantage, a spare part that is available in any case, in this case a spare key (35) with an additional intermediate storage function, can be used to transport the data from programming device (3) to vehicle (30).

The transmission of vehicle-related data described with reference to FIGS. 1 and 2 from the central office to a vehicle component can be used not only as described to feed anti-theft related data information into the spare part, but also to perform special functions in vehicle components as will be explained below with reference to the device in FIG. 2.

Such a special function relates for example to the locking or unlocking of vehicle locks. In a secure vehicle protection system, the locks that belong to a vehicle should be capable of being distinguished data-wise, in other words, each key, in addition to a vehicle-specific number, also has an individual key-specific key number and incorporates a special secret cryptographic code value that encodes the authentication data. In each individual vehicle component related to anti-theft protection (32, 33, 38, 39) in the example of FIG. 2, a register (43) is provided that shows which keys are blocked. Since changes in these data are critical for security, measures have been taken to prevent manipulation in this regard. In order to guarantee secure operation, an effort is made to ensure that such data-change commands are handled only through central office (20). For this purpose, a conventional cryptographic method is used once again, in which a command issued from central office (20), for blocking a certain key for a certain vehicle for example, is transmitted without falsification to the vehicle components involved (32, 33, 38, 39). Encoding methods suitable for this purpose that guarantee the authenticity of the information are described in the above-mentioned German patent documents DE 44 11 449 C1, DE 44 11 450 C1, and DE 44 11 451 C1. These cryptologically protected commands can advantageously be transmitted with the device according to FIG. 2 from central office (20) over the data transmission line to special key (35) and from there to one or more of the vehicle components (32, 33, 38, 39) involved. Of course, in addition to the command to block or unblock keys, other commands can also be transmitted in protected form from central office (20) to vehicle (30) and performed there.

Another possible application of the device in FIG. 2 relates to the possibility of status inquiries via central office (20). This use is based on the fact that all relevant commands originate at central office (20), in other words an individual service center (1) is able to program a spare key, to program a spare part relevant to anti-theft protection, or to block or unblock a key only when suitable data have been requested from central office (20). Central office (20) is therefore informed fully of the status of the anti-theft protection system of every vehicle (30). If necessary, provision can also be made such that central office (20) requires approval of certain operations, such as the blocking of locks, which can be performed by transmitting encoded data from vehicle (30) to central office (20), bypassing the transmission device described above for the vehicle-related data, and specifically by using conventional cryptologic methods, for example a symmetric encoding method. Special key (35) is again used as the transport medium between components (32, 33, 38, 39) in the vehicle and terminal (2) at service center (1). The approval information can be transmitted from special key (35) to central office (20) either after the installation of a suitable spare part (33, 38, 39) by again inserting special key (35) into programming device (3) or by the approval information being read out from special key (35) automatically before the next special function is performed. Since, as we have said, this means that central office (20) is always informed about the current status of all vehicles relevant to anti-theft protection, it can provide information at any time as to which keys are valid for a given vehicle. This makes it possible for example for vehicle insurers to call up suitable information about a vehicle theft in order to be able to determine whether all of the valid keys were in fact presented by the insured.

The devices shown in FIGS. 1 and 2 and with this method that can be performed for encoded data transmission from a central office (20) to a key (4) or by means of a spare key (35) that functions as an intermediate storage component, to components (33) on the vehicle can be made such that an encoded data transmission is possible in both directions. In this way, if necessary, data that must be kept secret, can be transmitted back from a key (4) or by using a spare key (35) that functions as an intermediate storage component, from one of the vehicle components (32, 33, 38, 39) involved in encoded form and thus sent secure to central office (20). As already mentioned, this possibility can be used for example to feed back an approval signal. It is also possible to transmit other secret or nonsecret data from key (4) or from vehicle components (32, 33, 38, 39) to central office (20), such as for example the current status of the anti-theft protection system or the current odometer reading.

Another possible application of the method according to the invention and the device according to the invention consists in the field of vehicle rental with the requirement of being able to grant certain customers a limited usage authorization for certain vehicles. The property of the key (4 or 35), namely that it has an identification number (13, 13') and transmits the latter as proof of identity to central office (20), can be used as proof of identity for the customer, with one key being permanently assigned to each customer. Then, by means of the devices shown in FIGS. 1 and 2 and with the described procedure, on a protected path, usage authorization data for an individual vehicle desired by a customer can be transmitted to this customer from central office (20), specifically to his key (4). These can be usage authorization data which allow the customer only limited mobility with the desired vehicle. This mobility limitation can be accomplished for example by virtue of the fact that the usage authorization data transmitted by central office (20) are selected so that key (4) can unlock or turn off the anti-theft protection system of the vehicle only for a certain number of actuations, such as engine starts, for example. It is also possible to expand the devices on the vehicle shown in FIGS. 1 and 2 in a conventional manner so that limitation of mobility in terms of time, geography, or distance is possible. The limiting values required for this purpose, and presettable individually by central office (20), are likewise transmitted by the procedure described for FIG. 2 on a secure path to key (35) and, upon its first operation of the vehicle (30), to components (32, 33, 38, 39) on the vehicle.

In the last application mentioned, data communications with central office (20) necessarily occur very frequently. If necessary, therefore, a provision can be made to store data sets for certain vehicle groups from the actual central office (20), advantageously located at the vehicle manufacturer, to a local central office which is located at an automobile rental office or a leasing company. Data sets for vehicles that are sold by these locations at a later point in time can then be stored back in actual central office (20).

Various systems are described in FIGS. 3 to 6 in which a limitation of mobility is imposed on the vehicle by virtue of the fact that the data sets that are programmed by an individual central office into a vehicle key in accordance with the procedure described above are highly protected against manipulation, and permit only a limited, presettable number of usage authorization release actions by the vehicle key, i.e. actuations to operate a central locking system and/or an electronic drive-away locking device. A usage authorization release method is the basis of these systems, in which an individual usage authorization is issued by a usage authorization code, with a new code being used for each release action that must be stored or generated, in the vehicle key in question and also in the vehicle control device to be controlled. Mobility limitation is then implemented by virtue of the fact that the central office, as part of the data to be programmed into each individual vehicle key, transmits only a preset number of successive usage authorization codes, or information to calculate only this limited number of usage authorization codes. As a result, the vehicle with this key can be operated only within limits, for example, for a certain period of use, provided the key is not updated with a new set of usage authorization. On the basis of these properties, the vehicle systems described below can be created as vehicle rental systems with a high level of protection against fraud or private vehicles with a high level of protection against usage by others.

Figure 3:
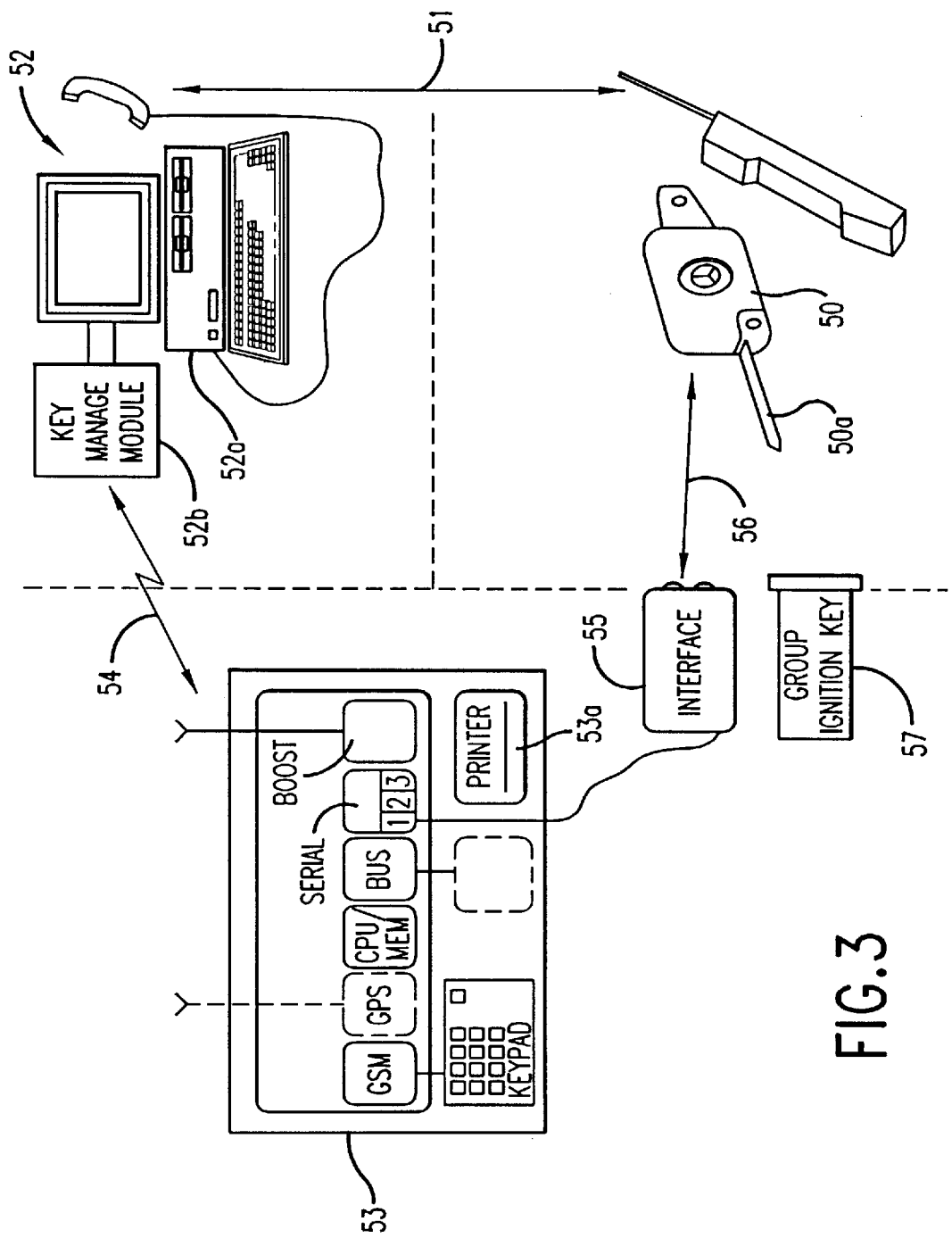
FIG. 3 is a schematic block diagram of a system for short-term vehicle rental according to the invention.

FIG. 3 shows an advantageous system for vehicle short-term rental. In this system, in a one-time management process, the customer signs a usage agreement with the lessor and obtains a personal customer number and an electronic vehicle key (50). At a desired point in time, the customer can then request a rental vehicle over a telephone line (51) at a pickup location (52) of the lessor that is located at the desired point in time at a desired place in his immediate vicinity. A pickup location computer (52a) then transmits the vehicle identification and a desired number of usage authorization codes to a connected key management module (52b) in which the usage authorization codes of the vehicle fleet of the auto lessor are stored. The key management module (52b) is designed as an inaccessible unit, for example as a "crypto box" in the form of a computer plug-in card or a PCMCIA module, and itself contains the usage authorization codes or a calculation algorithm for all the electronic keys of all of the vehicles in the rental fleet. It then reserves from this number of codes the desired limited number of usage authorization codes for the customer request and transmits them to pickup location computer (52a). The latter then promptly transmits, prior to the point in time planned for accepting the vehicle, the customer number and the limited number of usage authorization codes, and possibly additional order data such as the length of the reservation for example, to a "Telematik" module that can be retrofitted (53). Data transmission takes place over a corresponding wireless data transmission line (54) that is protected against manipulation in the manners described with reference to FIGS. 1 and 2. "Telematik" module (53) functions as a service center with a programming device, like the device of FIGS. 1 and 2, incorporating additional functionalities shown in FIG. 3 that need not be described in greater detail here.

The customer then finds, during the period agreed upon, the vehicle location which he knows and brings his key (50), not yet authorized for driving, to an interface (55) connected with a "Telematik" module (53) to transfer the data between key (50) and "Telematik" module (53) over a wireless transmission line (56) such as an infrared, radio, or inductive transmission line for example. Interface (55) can be an infrared interface associated with a matching window, for example. Vehicle key (50) identifies itself during this data transmission by providing the customer number to the "Telematik" module (53) and is then loaded by the latter, functioning as the key programming unit, with the data set received from central office (52). At the same time, a copy of the rental agreement with customer data, information on the length of use, and vehicle data can be output by a printer (53a). The customer can then use vehicle key (50) in the usual fashion for the period of use. To start the vehicle engine, key (50) has a mechanical key part (50a) that can be plugged into a group ignition lock (57) with which all of the vehicles in the rental fleet are equipped.

In order to notify central office (52) that vehicle usage has come to an end, the customer, after returning to a parking location and locking the vehicle, places his key (50) in interface (55) once more. This is recognized by "Telematik" module (53) which then reads the first unused usage authorization code from key (50) and transmits it to the pickup location center (52) for storage. This code value can then be used as the first code value for another customer. In addition, to remove the value from used key (50), a delete signal is transmitted to it. After checking the code storage state in key (50), an optical display on the "Telematik" module (53) notifies the customer that the rental process has been successfully completed, for purposes of billing and final disposition. Customer key (50) is now unusable, either for the vehicle most recently used or for any other vehicles.

If the key is lost before a rental process is completed, central office (52) is able, by issuing a new usage authorization code support location to a key belonging to its maintenance service, to pick up the vehicle and render the lost key unusable. If the vehicle has a navigation system, such as a GPS receiver indicated by the dashed lines in FIG. 3, in "Telematik" module (53), the vehicle position data can be transmitted from this position location system to center (53). This can be used to perform an open rental operation in which it is not necessary to leave the used vehicle at a drop-off location. Instead, the vehicle can be left anywhere and rented again from there or transferred to another location. Remote transmission of limited driving authorization makes the auto rental offices completely independent of personnel, and they can consist for example of only a drop-off location or a parking place, while the transfer of driving authorization, just like vehicle pickup and billing, can be handled by the customer through a single central rental office (52).

Figure 4:
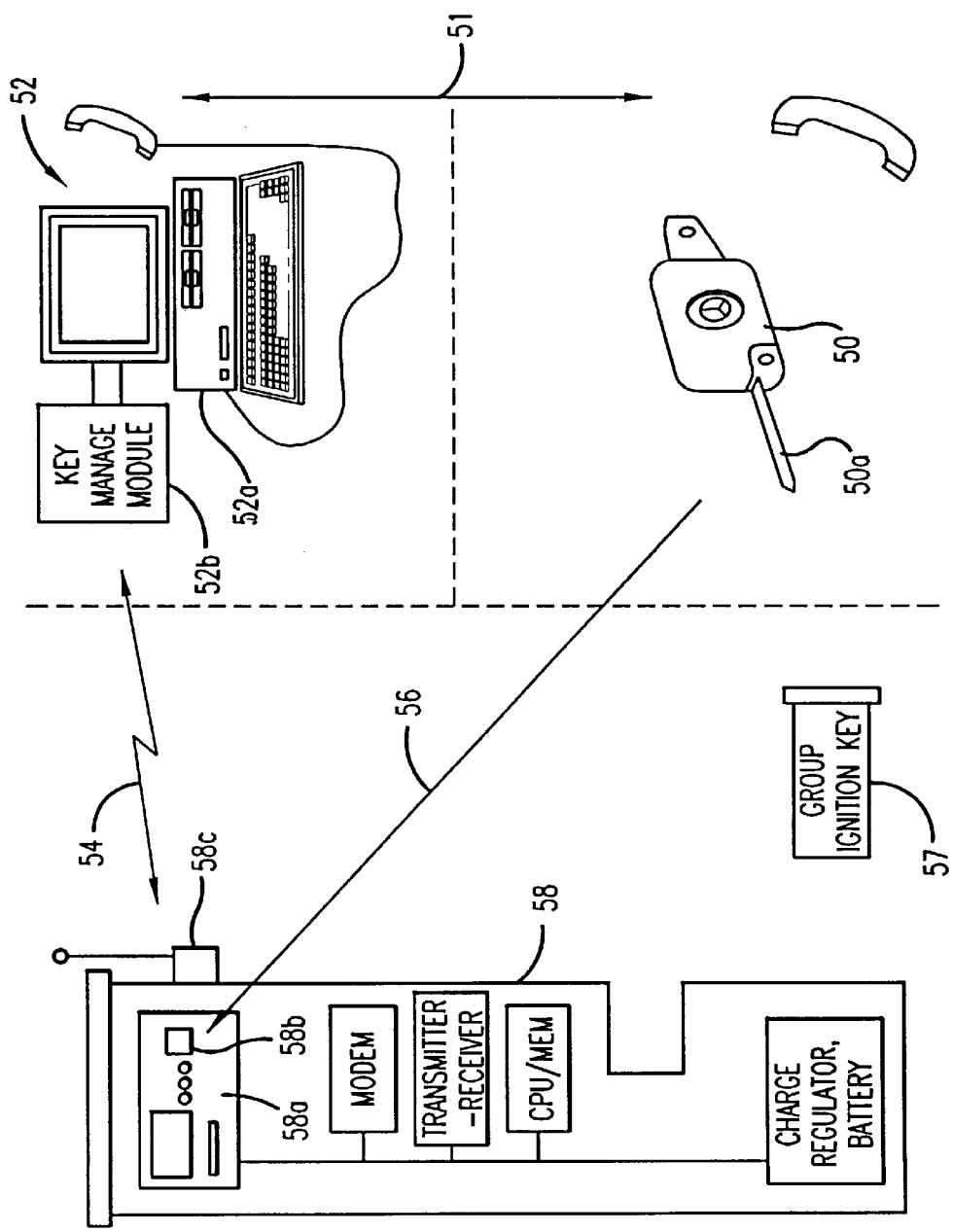
FIG. 4 is a schematic block diagram of a vehicle rental system according to the invention with parking-space terminals.

FIG. 4 shows a rental system similar to the one in FIG. 3, with the same reference numerals being used for components that are functionally the same, so that the description of FIG. 3 can be referred to. In contrast to the system in FIG. 3, the rental system in FIG. 4 has fixed parking meters (58) with key programming units (58a) which perform, as far as key programming is concerned, the same function as the "Telematik" module (53) built into the vehicle in the system according to FIG. 3. In addition, the key programming unit (58a) of the individual parking meter (58) has an interface (58b) for wireless communication, protected against manipulation, with the individual vehicle key (50) as well as a transceiver (58c) for wireless communication, protected against manipulation, with central rental office (52). Consequently, in this system the customer loads his vehicle key (50) at parking meter (58) with the desired number of usage authorization codes that is provided at the parking space at which he begins using the vehicle, for which purpose the corresponding data are transmitted to parking meter (58) by central rental office (52) in response to a telephoned rental request by the customer. Otherwise, the properties and advantages of the system shown in FIG. 3 apply to this rental system as well.

Figure 5:
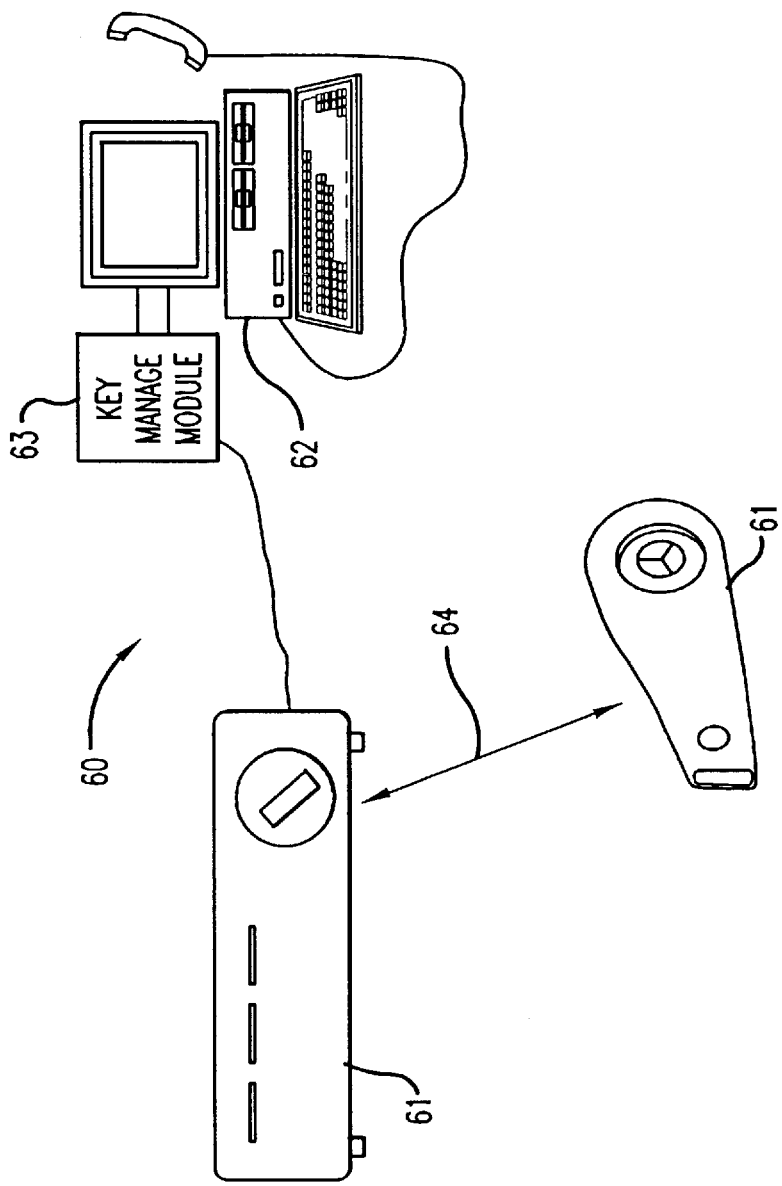
FIG. 5 is a schematic block diagram of a vehicle rental system according to the invention protected against fraud, with direct vehicle transfer.

FIG. 5 shows a vehicle rental system in which the vehicle lessor gives the customer a vehicle together with the key at a rental station (60) in conventional fashion. However, he does not give the customer a key of the usual type that provides unlimited authorization to use the vehicle, but in accordance with the systems in FIGS. 3 and 4, the customer is given a vehicle key (61) with limited usage authorization. For this purpose, the rental station has a key programming unit in the form of write/read device (61) connected to a computer (62) with an associated key management module (63). Depending on the planned period of usage of the vehicle, write/read unit (61) writes a limited number of usage authorization codes, as described in the systems of FIGS. 3 and 4, on a vehicle key (61) which does not yet authorize driving, in other words in code protected form, in the key according to the procedure in FIGS. 1 and 2, over a corresponding data transmission line (64). This key (61) is then given to the customer for limited use of the vehicle together with the vehicle. When the limited number of usage authorization codes is used up, key (61) has no value, in other words, neither the central locking system nor the drive-away lock on the vehicle can be actuated with it. Since the rental customer is aware of this, it can be expected that he will not make any attempts at fraud.

Figure 6:
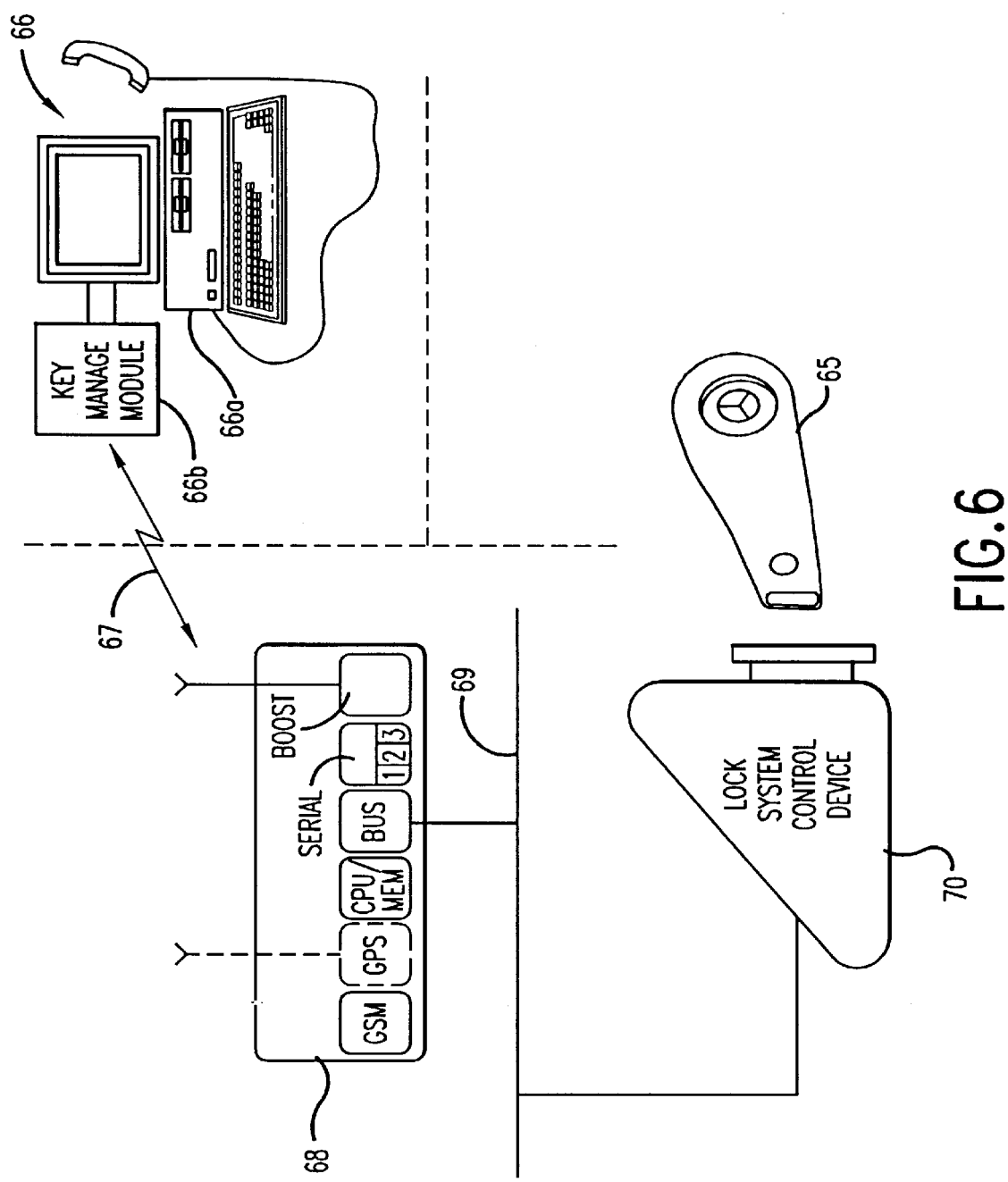
FIG. 6 is a schematic block diagram of a vehicle system according to the invention for private use that is protected against use by others.

FIG. 6 shows a system suitable for private vehicles with a high level of protection against theft, by virtue of the fact that the vehicle key or keys (65) that can be used on the vehicle are loaded in accordance with the systems described above with only a limited number of usage authorization codes. A corresponding central office (66), which can be located for example at the vehicle manufacturer and has a computer (66a) with a key management module (66b) connected to it, depending on the requirement, issues for each vehicle it handles a limited number of successive usage authorization codes which are transmitted without wires over a GSM long-distance data transmission link to a "Telematik" module (68) that can be retrofitted on the vehicle, similar to that (53) in FIG. 3. The "Telematik" module (68), which also functions as a key programming unit, loads the corresponding data through a vehicle data bus system (69) and a locking system control device (70) into programmable electronic vehicle key (65). Locking system control device (70) is designed in this example so that it counts the authorization actions triggered by individual key (65) for the purpose of releasing usage authorization on the vehicle, in other words, the number of usage authorization codes transmitted by key (65), and when a fixed threshold is exceeded, transmits a signal to "Telematik" module (68) instructing the latter to request an additional successive set of usage authorization codes from central office (66). This process is automated and takes place in ample time before complete consumption of the usage authorization code currently programmed in key (65), without the customer taking any notice of it.

If central office (66) has received a report of unauthorized usage of the vehicle in question, it does not send out the requested data set, with the consequence that after the usage authorization code currently stored in key (65) is used up, the electronic drive-away lock is no longer actuated, and in particular can no longer be unlocked. The same effect occurs if manipulations are performed on the vehicle and its communications equipment without authorization such that a proper connection between the vehicle and central office

(66) can no longer be established, so that no usage authorization codes can be transmitted either. It is only if none of these blockage messages are present that central office (66) sends another set of usage authorization codes, in encoded form, to "Telematik" module (68), which passes these data to the locking system control device (70), which transmits them over its infrared or inductive interface to key (65) in which they are then decoded and stored in order to permit further usage authorization release actions. In one variation, the usage authorization codes that have been used to transmit a signal requesting transmission of another set of usage authorization codes are counted by the suitably designed vehicle key itself and not by the locking system control device. It can be expected that after such private vehicle systems with limited key utilization times become known, the risk of attempts to steal the vehicle without authorization along with the key will drop sharply.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for programming data into a vehicle component, the method comprising the steps of:
    requesting data from a central office;
    transmitting data from the central office in an encoded form as encoded data to the requesting location at least with an individual vehicle-component-related code; and
    decoding only in said vehicle component itself said encoded data that was encoded at the central office and was received by the requesting location with a code that is related to the vehicle component.

2. The method according to claim 1, further comprising the steps of:
    transmitting to the central office in order to request the data from the central office at least information about an identity of the vehicle, an identity of the vehicle component to be programmed, and an identity of a system user placing the request; and
    checking said requesting information by the central office for authorization before said central office encodes and transmits the required data.

3. The method according to claim 1, further comprising the step of storing by a programming device, located at the requesting location, the encoded data sent out by the central office in the vehicle component connected for this purpose to the programming device and which is to be programmed.

4. The method according to claim 2, further comprising the step of storing by a programming device, located at the requesting location, the encoded data sent out by the central office in the vehicle component connected for this purpose to the programming device and which is to be programmed.

5. The method according to claim 1, further comprising the steps of:
    before sending the data encoded with the vehicle-component-related code out of the central office, additionally encoding said data at the central office with a code related to an intermediate storage component to provide a doubly encoded data;
    initially feeding said doubly encoded data, after reception by the requesting location, by a programming device present at said requesting location into the intermediate storage component connected to the programming device;
    decoding said doubly encoded data in said programming device with regard to said code relating to the intermediate storage component and storing on an intermediate basis as data still encoded with the code relating to the vehicle component; and
    after connecting the intermediate storage component to a data transmission system on the vehicle, to which the vehicle component to be programmed is connected, reading out the data still encoded with the code related to the vehicle component from the intermediate storage component and feeding it through the data transmission system on the vehicle into the vehicle component to be programmed, wherein said data is completely decoded.

6. The method according to claim 2, further comprising the steps of:
    before sending the data encoded with the vehicle-component-related code out of the central office, additionally encoding said data at the central office with a code related to an intermediate storage component to provide a doubly encoded data;
    initially feeding said doubly encoded data, after reception by the requesting location, by a programming device present at said requesting location into the intermediate storage component connected to the programming device;
    decoding said doubly encoded data in said programming device with regard to said code relating to the intermediate storage component and storing on an intermediate basis as data still encoded with the code relating to the vehicle component; and
    after connecting the intermediate storage component to a data transmission system on the vehicle, to which the vehicle component to be programmed is connected, reading out the data still encoded with the code related to the vehicle component from the intermediate storage component and feeding it through the data transmission system on the vehicle into the vehicle component to be programmed, wherein said data is completely decoded.

7. The method according to claim 2, wherein said request data to be transmitted to the central office to request data to be programmed into the vehicle component includes identification information of a requesting vehicle key or intermediate storage component; and
    wherein said data transmitted by the central office contains mobility-limiting information for only limited usage authorization release.

8. The method according to claim 3, wherein said request data to be transmitted to the central office to request data to be programmed into the vehicle component includes identification information of a requesting vehicle key or intermediate storage component; and
    wherein said data transmitted by the central office contains mobility-limiting information for only limited usage authorization release.

9. The method according to claim 5, wherein said request data to be transmitted to the central office to request data to be programmed into the vehicle component includes identification information of a requesting vehicle key or intermediate storage component; and
    wherein said data transmitted by the central office contains mobility-limiting information for only limited usage authorization release.

10. The method according to claim 7, further comprising the step of permitting with the data that are sent out by the central office in response to an individual request and to be programmed into a vehicle key, only a presettable number of usage authorization release actions by the vehicle key.

11. The method according to claim 10, further comprising the steps of:

recording the number of usage authorization release actions in the vehicle; and before said number of usage authorization release actions permitted by the data programmed into the vehicle key is reached, transmitting a request for information to the central office which, only if no blocking message is present, again transmits data for programming into the vehicle key, which data permits a presettable number of additional usage authorization release actions.

12. A device for programming data into a vehicle component, particularly a vehicle spare part, the device comprising:

a central office having memories for vehicle-related data and for vehicle-component-related code data;

a coding device for encoding said vehicle-related data to be programmed into the vehicle component into encoded data;

at least one service center connected via a data transmission line with the central office, each one of said at least one service center having a programming device to which the vehicle component to be programmed is connectable for supplying it with said encoded data received by the at least one service center;

wherein the vehicle component to be programmed with the vehicle-related data includes a decoder for decoding the encoded data that are fed-in and was encoded at the central office with the code that is related to the vehicle component.

13. A device for programming data into an individual vehicle component, particularly a vehicle spare part, comprising:

a central office having memories for vehicle-related data, for coded data related to an intermediate storage component, and for code data related to the individual vehicle component, as well as an encoder for successive encoding of the code data to be programmed into the individual vehicle component firstly with an individual code related to the individual vehicle component to provide encoded data and then with a further code related to the intermediate storage component to provide a doubly encoded data;

at least one service center connected via a data transmission line with the central office and having a programming device to which the intermediate storage component is connectable to supply it with the doubly encoded data received by the at least one service center;

wherein the intermediate storage component includes a decoder for decoding the doubly encoded data supplied with regard to the code related to the intermediate storage component, and then storing on an intermediate basis the encoded data that are still encoded with the code related to the individual vehicle component, wherein after connection to a data transmission system on the vehicle to which the vehicle component to be programmed with the data is connected, said encoded data being fed into the individual vehicle component; and wherein the individual vehicle component to be programmed with the data has a decoder for decoding the encoded data still encoded with the code related to the individual vehicle component that is fed in.

14. The device according to claim 12, wherein said central office further has a request authorization testing unit that checks information to be provided by said at least one service center to the central office for requesting vehicle-related data for the individual vehicle component regarding a vehicle in question, a vehicle component, and a system user, for authorization.

15. The device according to claim 13, wherein said central office further has a request authorization testing unit that checks information to be provided by said at least one service center to the central office for requesting vehicle-related data for the individual vehicle component regarding a vehicle in question, a vehicle component, and a system user, for authorization.

16. The device according to claim 12, wherein said central office further has a computer with a key management module connected to it for storing and transmitting a limited number of successive usage authorization codes for programming into a vehicle key, with a key programming unit serving as the at least one service center and being located in one of a vehicle, a parking meter, or the central office.

17. The device according to claim 13, wherein said central office further has a computer with a key management module connected to it for storing and transmitting a limited number of successive usage authorization codes for programming into a vehicle key, with a key programming unit serving as the at least one service center and being located in one of a vehicle, a parking meter, or the central office.

18. The device according to claim 14, wherein said central office further has a computer with a key management module connected to it for storing and transmitting a limited number of successive usage authorization codes for programming into a vehicle key, with a key programming unit serving as the at least one service center and being located in one of a vehicle, a parking meter, or the central office.

19. Device according to claim 16, wherein a number of usage authorization release actions triggered by an individual vehicle key is detected by said vehicle key itself or by a unit on said vehicle, said key or unit sending a request signal to the central office before the number of usage authorization codes to be transmitted in succession is reached, in order that an additional set of successive usage authorization codes for programming into the vehicle key be sent, with said central office linking a corresponding transmission process to a non-presence of a corresponding blocking message.

20. A method for programming data into a vehicle component, the method comprising the steps of:

requesting data from a central office;

encoding said data at the central office with an individual vehicle-component-related code to obtain encoded data;

transmitting said encoded data from the central office through the requesting location and into said vehicle component; and decoding only in said vehicle component itself said encoded data received through the requesting location with a code that is related to the vehicle component.

* * * * *